United States Patent [19]

Sollner

[11] Patent Number: 5,390,463
[45] Date of Patent: Feb. 21, 1995

[54] MODULAR TRUSS STRUCTURE

[75] Inventor: Roland Sollner, Battle, England

[73] Assignee: Penn Fabrication (U.S.A.) Inc., Moorpark, Calif.

[21] Appl. No.: 157,817

[22] Filed: Nov. 24, 1993

[51] Int. Cl.⁶ .............................................. F04B 1/343
[52] U.S. Cl. ................... 52/726.2; 52/585.1; 52/650.1; 52/655.1; 52/653.2; 52/745.2; 403/14; 403/308; 403/361
[58] Field of Search ............... 52/726.1–726.4, 52/641, 646, 648.1, 650.1, 653.2, 655.1, 656.9, 745.19, 127.1, 585.1, 745.2; 403/11, 13, 14, 303, 308, 334, 361

[56] References Cited

U.S. PATENT DOCUMENTS

| | | | |
|---|---|---|---|
| 1,188,485 | 6/1916 | Pruyn | 52/DIG. 1 X |
| 2,308,565 | 1/1943 | Mitchell | 52/650.1 |
| 2,936,051 | 5/1960 | Martin | 52/650.1 X |
| 4,437,782 | 3/1984 | Geisthoff | 403/13 |
| 4,819,402 | 4/1989 | Schneider | 52/726.1 |
| 5,103,616 | 4/1992 | Nordberg | 52/585.1 |
| 5,144,780 | 9/1992 | Gieling et al. | 52/726.1 X |
| 5,205,101 | 4/1993 | Swan et al. | 52/650.1 |

FOREIGN PATENT DOCUMENTS

| | | | |
|---|---|---|---|
| 0180535 | 5/1986 | European Pat. Off. | 403/14 |
| 2238792 | 2/1973 | Germany | 52/585.1 |
| 0000585 | 4/1980 | WIPO | 52/641 |

*Primary Examiner*—Michael Safavi
*Assistant Examiner*—Robert J. Canfield
*Attorney, Agent, or Firm*—Freilich, Hornbaker & Rosen

[57] ABSTRACT

A modular truss system (30) is disclosed that is especially suited for support of lighting, cameras and the like in association with a stage for performances thereon. The truss system includes cups (80) and alignment members (82) that aid in aligning the truss modules (62) for assembly thereof. The system also includes box shaped braces (78) to achieve longitudinal and transverse strength.

12 Claims, 6 Drawing Sheets

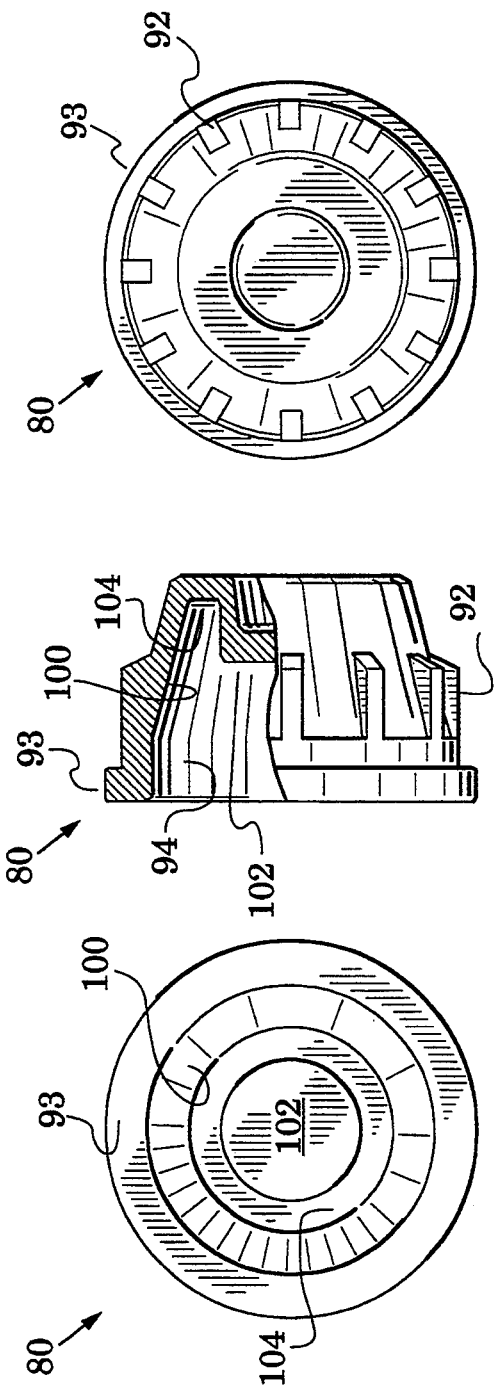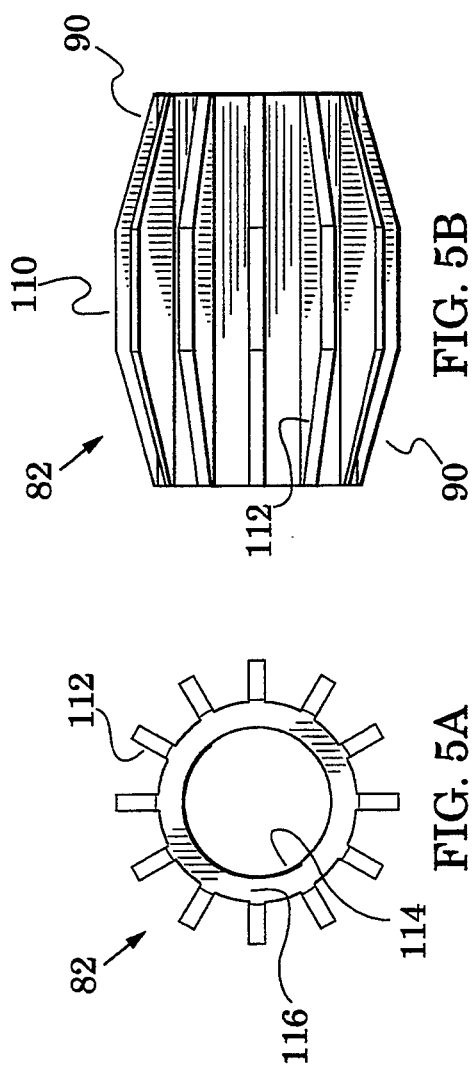

5,390,463

MODULAR TRUSS STRUCTURE

FIELD OF THE INVENTION

The present invention relates generally to truss structures and more particularly to modular truss structures intended for stage presentations.

BACKGROUND OF THE INVENTION

Public presentations, e.g., concerts, conventions, trade shows, are often enhanced and facilitated by a truss structure arranged in conjunction with a stage. The truss structure is typically configured to carry equipment associated with the onstage activity, e.g., lights, sound equipment, television cameras. When the truss structure must be repetitively moved between stage locations, as with a traveling show, it is preferably formed of modules which can be rapidly aligned, assembled, disassembled and stored.

SUMMARY OF THE INVENTION

The present invention is directed to a modular truss system for support of lighting, cameras, sound equipment and the like in association with stage presentations.

Structures in accordance with the invention are characterized by truss modules each defining an intermodule face, cup members carried in each alignment face to form a recess therein and alignment members each configured to have a first portion thereof received in a cup of one truss module and a second portion thereof received a cup of a second truss module when the intermodule faces of the truss modules are adjoining.

In accordance with a feature of the invention, the alignment members cooperate with the cups to facilitate alignment of the truss modules during assembly thereof.

In a preferred embodiment, longitudinal structural members of the truss modules are transversely and longitudinally braced by box shaped members disposed therebetween.

The novel features of the invention are set forth with particularity in the appended claims. The invention will be best understood from the following description when read in conjunction with the accompanying drawings.

BRIEF DESCRIPTION OF DRAWINGS

FIG. 4A is a front elevation view of the cup of FIG. 3;

FIG. 4B is a side elevation view of the cup of FIG. 4A;

FIG. 4C is a rear elevation view of the cup of FIG. 4A;

FIG. 5A is a front elevation view of the alignment member of FIG. 3;

FIG. 5B is a side elevation view of the alignment member of FIG. 5A;

DESCRIPTION OF THE PREFERRED EMBODIMENTS

Figure 1:
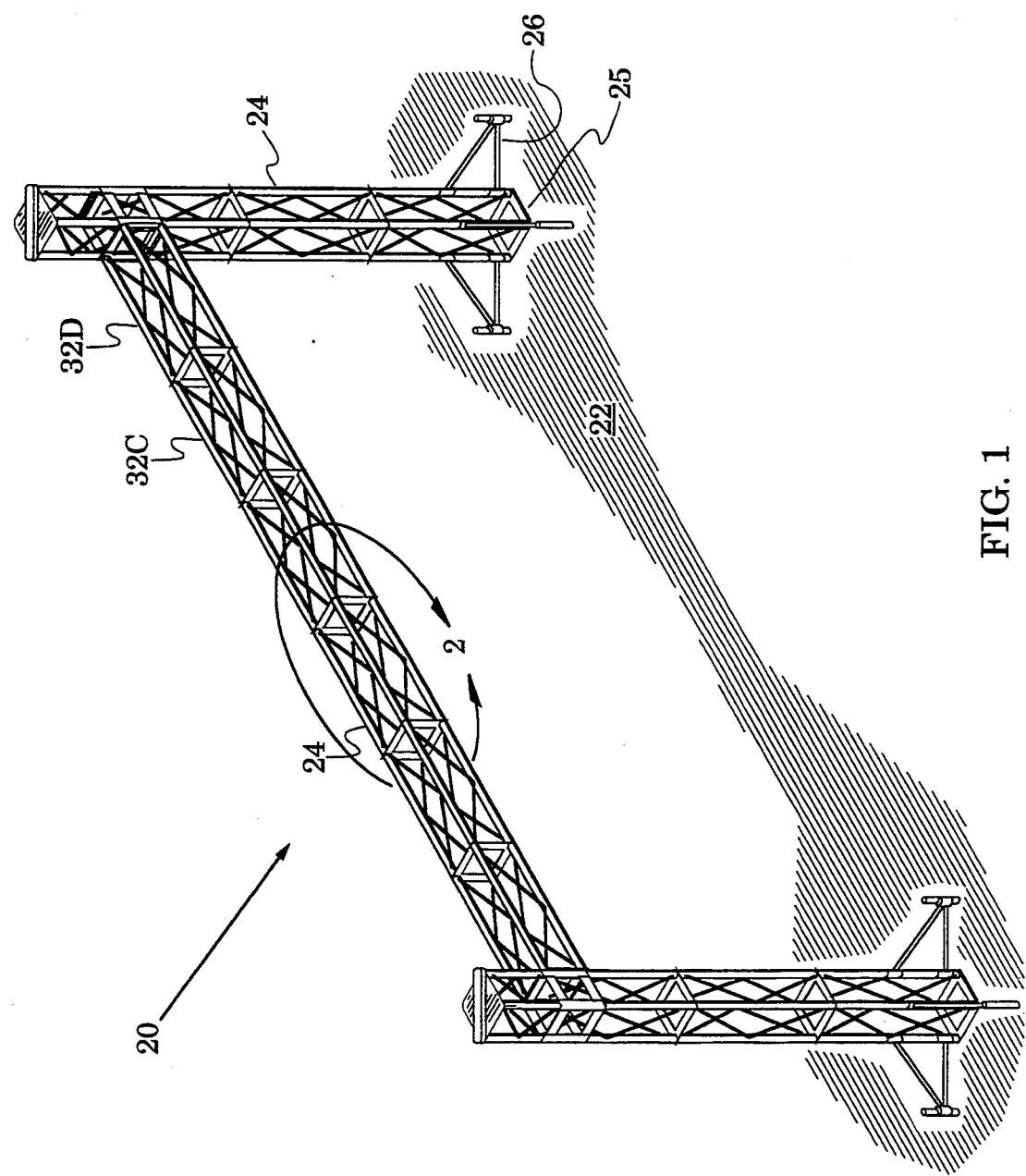
FIG. 1 is an isometric view of a typical modular truss assembly.

FIG. 1 is an isometric view of a typical modular truss assembly 20 disposed in association with a stage 22 to facilitate public presentations such as concerts, conventions and trade shows. The truss assembly 20 is formed of modular truss sections 24 and is stabilized along its base 25 by outward extending legs 26 that contact the stage 22. The truss assembly provides a frame generally used for mounting equipment associated with the onstage presentation, e.g., lights, sound equipment, television cameras. As discussed above in the background section, such truss assemblies often travel with the presentation from site to site and, accordingly, must be repetitively assembled and disassembled.

Figure 2:
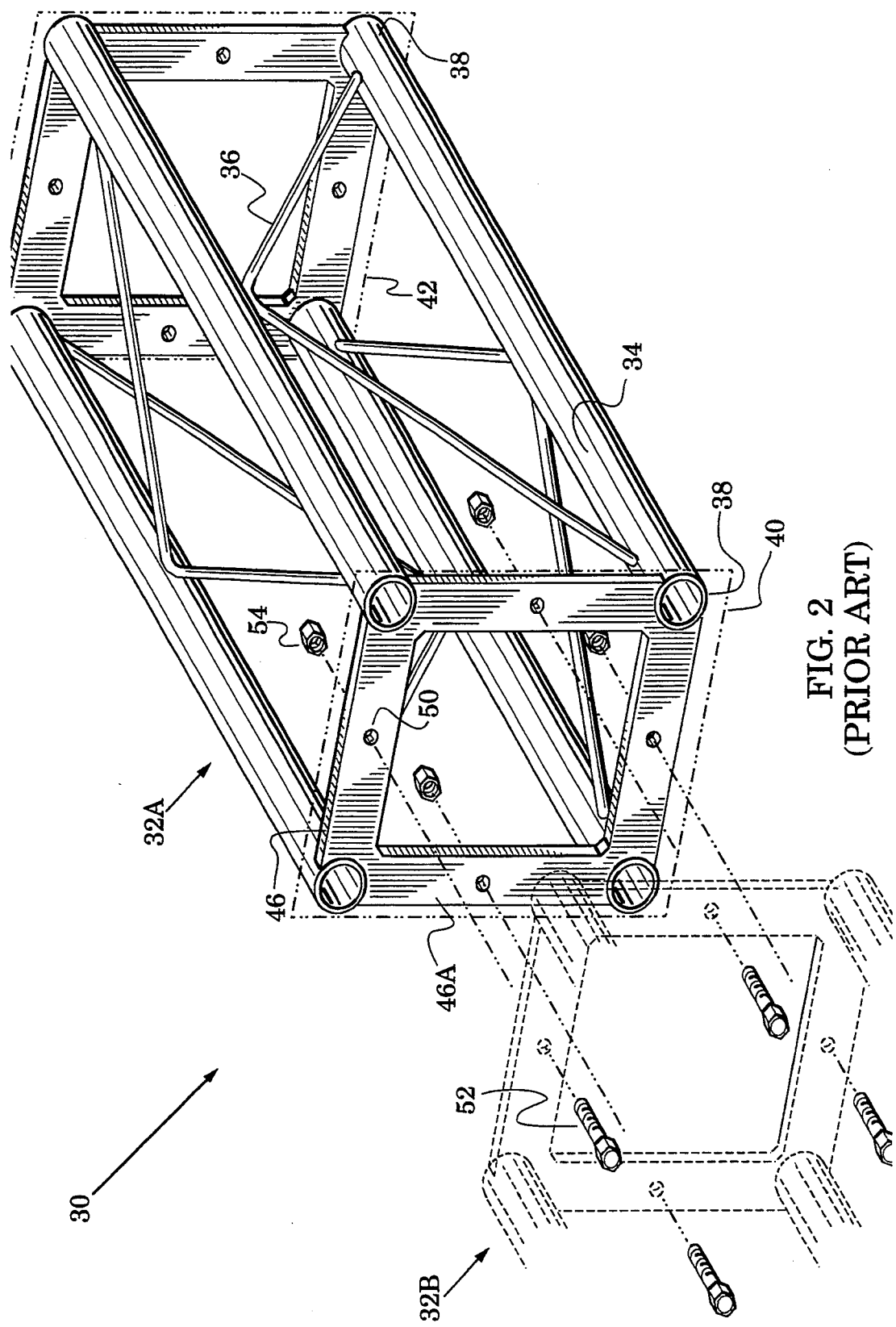
FIG. 2 is a view of truss modules within the curved line 2 of FIG. 1 illustrating a prior art modular truss structure.

FIG. 2 is a view of the structure within the curved line 2 of FIG. 1 illustrating a prior art modular truss structure 30. In the structure 30, elongated modules 32A, 32B (32B only partially shown in broken lines) are each formed with longitudinally arranged and transversely spaced structural members 34 in the form of hollow aluminum tubes. V shaped braces 36 are formed of a smaller diameter hollow aluminum tubing and welded between side pairs of structural members 34.

The structural members 34 terminate in ends 38 that are presented at longitudinally spaced and transversely arranged alignment faces 40, 42 schematically indicated by broken lines. A transverse brace 46 is formed of aluminum sheet or plate and arranged adjacent or adjoining each alignment face 40, 42. The brace 46 is welded to the ends 38. The brace 46 essentially provides a flat leg 46A between each pair of structural members 34 and could, therefore, be alternatively formed of separate leg members.

The truss modules 32 are typically intended to be assembled with the alignment faces of neighboring modules adjoining. In use, the modules 32 are moved relative to each other until corresponding holes 50 in the braces 46 are aligned for reception therethrough of fasteners in the form of bolts 52 and nuts 54 (and other conventionally associated hardware such as lockwashers). The fasteners retain the modules 32 with their alignment faces in an adjoining relationship. The truss modules 32 are disassembled by removal of the fasteners after which the modules can be stored for transportation to the next performance site.

The truss modules 32 are typically large, e.g., four meters in length, so that bringing the alignment faces of two modules into an adjoining relationship is not a trivial task, especially when this may involve modules located many feet above the stage, e.g., modules 32C, 32D in FIG. 1. The additional task of aligning holes 50 in adjoining braces 46 so that fasteners can be inserted therethrough can become frustrating and time consuming which resultant decrease in productivity.

Figure 3:
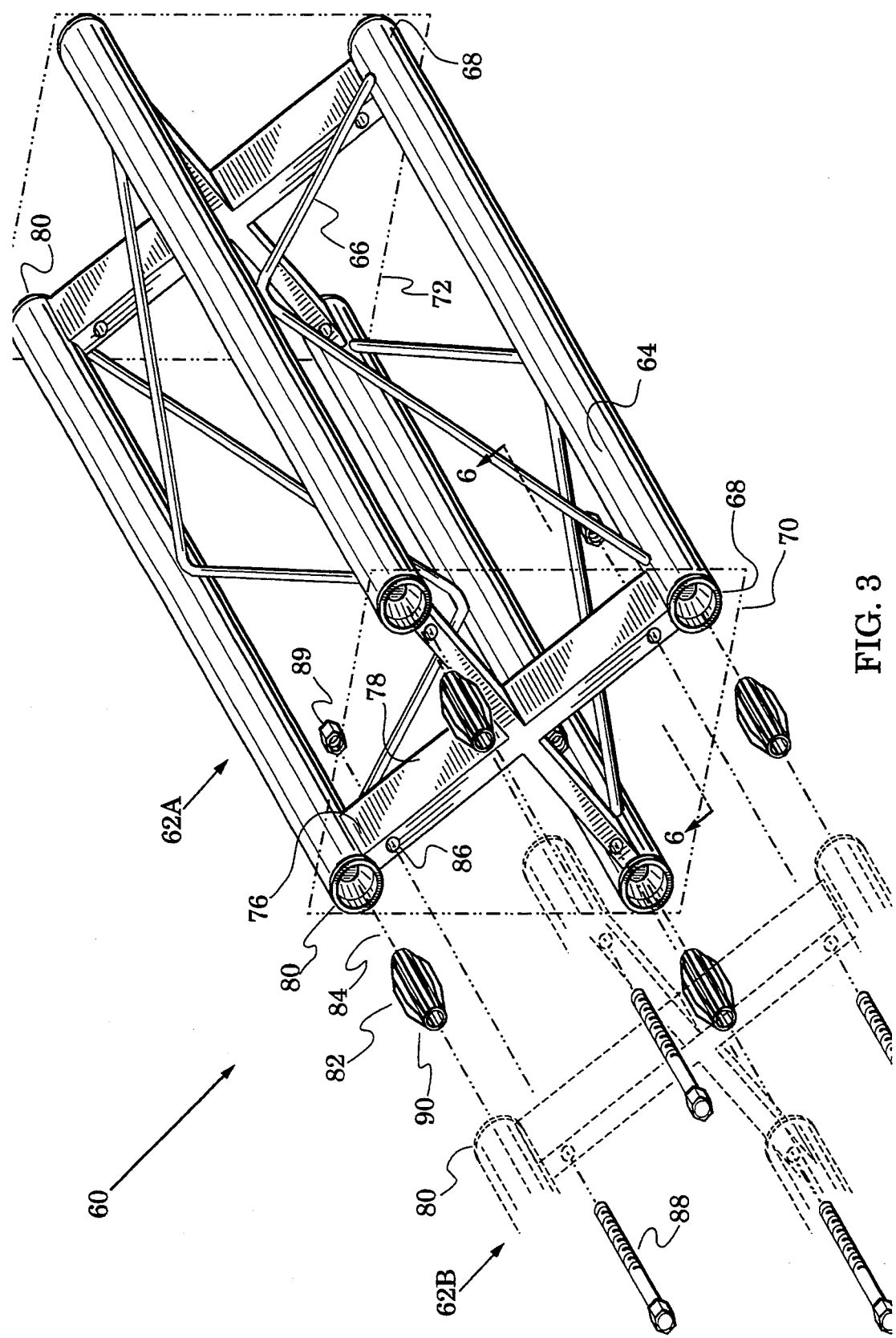
FIG. 3 is a view similar to FIG. 2 illustrating a modular truss structure embodiment in accordance with the present invention.

FIG. 3 is a view similar to FIG. 2 illustrating a preferred modular truss structure embodiment 60 in accordance with the present invention. The truss structure 60 includes truss modules 62A, 62B. Similar to the truss modules 32 of FIG. 2, the modules 62 are each formed with longitudinally arranged and transversely spaced structural members 64 in the form of hollow aluminum tubes and V shaped braces 66 are formed of a smaller diameter hollow aluminum tubing and welded between side pairs of structural members 64. Also, the structural members 64 terminate in ends 68 that are presented at longitudinally spaced and transversely arranged alignment faces 70, 72 schematically indicated by broken lines.

However, an X-shaped brace 76 is disposed adjacent or adjoining each alignment face 70, 72. Each leg 78 of the X-shaped brace 76 is welded to a different one of the structural members 64. Carried in each hollow end 68 of the structural members 64 is a cup 80. An alignment member 82 is configured to be received in the cups 80 as indicated by the broken lines 84. Each leg 78 of the X-shaped brace 76 defines a hole 86 for the insertion therethrough of fasteners in the form of bolts and nuts 88, 89.

In use, the alignment members 82 are placed in the cups 80 of one of the truss modules, e.g., the cups 80 in alignment face 70 of module 62A. Then an alignment face of truss module 62B is positioned near the alignment face 72 of the module 62A and the cups 80 in the truss module 62B slid over the protruding ends of the alignment members 82. The ends 90 of the alignment members 82 are tapered to facilitate this operation.

Longitudinal force on the truss modules 62A, 62B is now sufficient to maintain their aligned relationship while the fasteners 88, 89 are inserted through holes 86 and secured therein. Only longitudinal force is required because the alignment members 82 and corresponding cups 80 maintain the transverse alignment of the truss modules 62A, 62. Removing, from the assemblers of the truss assembly (20 in FIG. 1), the responsibility of maintaining truss modules 62 in transverse alignment while simultaneously feeding fasteners through the holes 86 considerably eases their task. Accordingly, assembly time is reduced and productivity increased.

The cup 80 is detailed in the front, side and rear elevation views respectively of FIGS. 4A, 4B and 4C. The cup 80 defines ribs 92 that are closely received in the hollow ends 68 of the structural members 64 of FIG. 3. A rim 93 extends radially to abut the structural member 64 and establish the insertion depth of the cup 80. The discontinuous surface presented by the ribs 92 facilitates insertion of the cups 80 into the ends 68. The interior surface 94 of the cup 80 includes a taper 100 which conforms with the tapered alignment member end 90 shown in FIG. 3. A raised table 102 in the bottom of the cup 80 defines an annular groove 104 therearound.

The alignment member 82 is detailed in the front and side elevation views respectively of FIGS. 5A and 5B. The alignment member 82 has a substantially cylindrical body 110 with tapered ends 90. The body is thus configured to conform with the interior surface 94 of the cup 80. Alignment member 82 defines ribs 112 that run longitudinally between the tapered ends 90. The discontinuous surface presented by the ribs 112 facilitates insertion of ends 90 into the cups 80. The alignment member 82 preferably has a central bore 114 for lightness and conservation of fabrication material. In addition, the bore 114 defines an annular collar 116 at each end 90 which is received in the annular groove 104 of the cup 80 to facilitate alignment therebetween. The cups 80 and alignment member 82 are preferably formed of an inexpensive moldable polymer, e.g., polypropylene.

Figure 6:
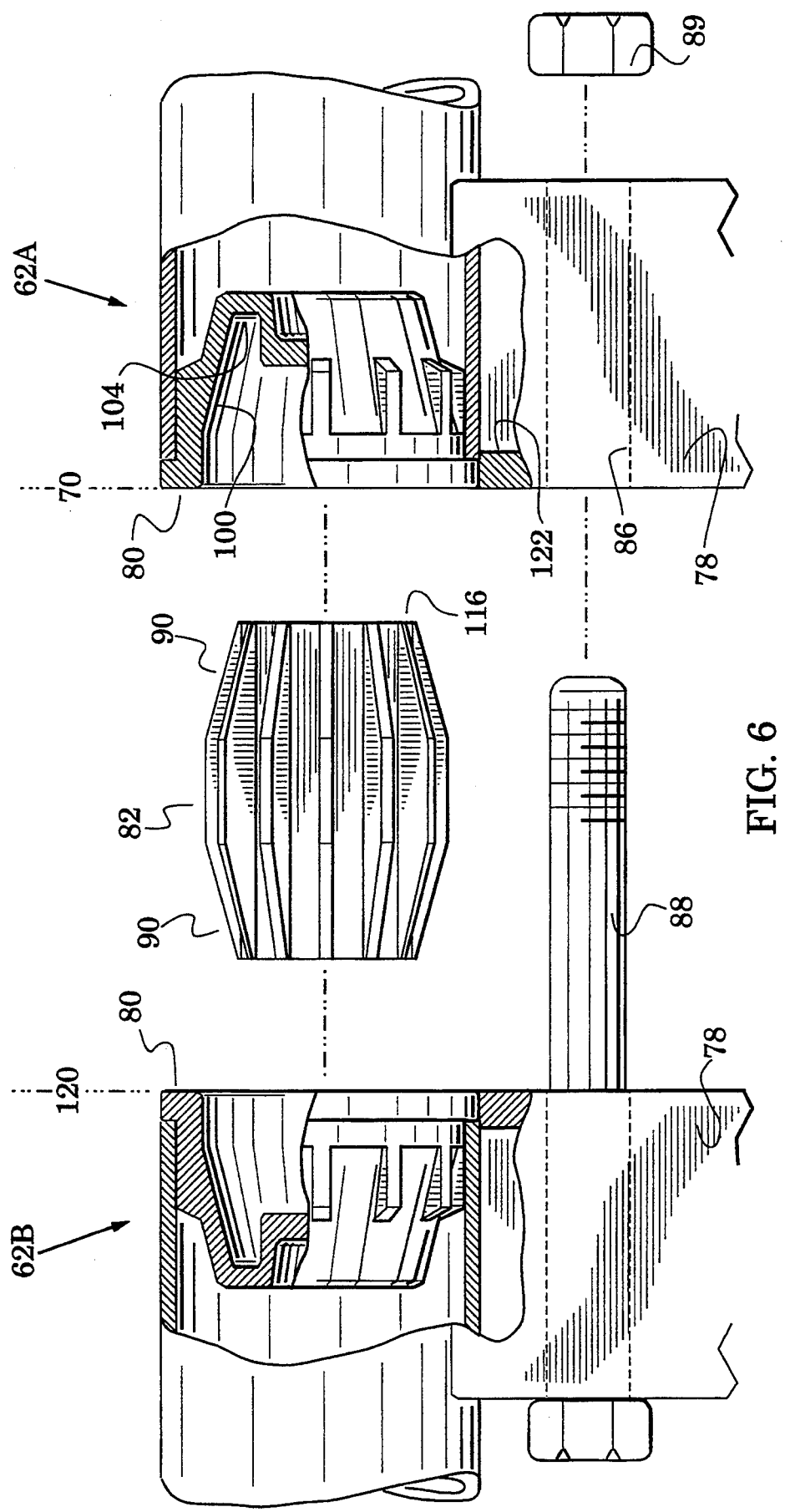
FIG. 6 is a view along the line 6—6 of FIG. 3.

FIG. 6 is a view along the plane 6—6 of FIG. 3 illustrating how the alignment member 82 is received into the cups 80 of adjacent truss modules 62A, 62B. FIG. 6 clearly shows how each end 90 of the alignment member is received into each cup 80. The tapered end 90 conforms with the interior surface taper 100 while the collar 116 is received into the groove 104. When the alignment face 70 of truss module 62A is moved to adjoin the alignment face 120 of truss module 62B, approximately one half of the alignment member 82 is retained inside of each cup 80.

The legs 78 of each X-shaped transverse brace 76 are shown to be formed of a hollow box shaped structural member. These legs 78 are preferably formed of aluminum extrusions and may be notched in the center to receive each other and then welded to produce the X-shaped brace. The box shaped legs 78 are hollowed for lightness and dimensioned to provide walls 122 that are spaced both longitudinally and transversely for strength and rigidity. The legs 78 include walls especially spaced longitudinally for strength superior to that provided by the prior art leg braces 46A of FIG. 2 which have inferior longitudinal dimensions. The fasteners 88, 89 extend through the legs 78 to retain the alignment faces in adjoining relationship. It may be appreciated that, in addition to facilitating alignment of the truss modules, the alignment member 82 and corresponding cups 80 also contribute to transverse and torsional strength of the assembled modules since they cooperate in a manner similar to that of joining structures utilizing dowel pins received into alignment holes.

Figure 7A:
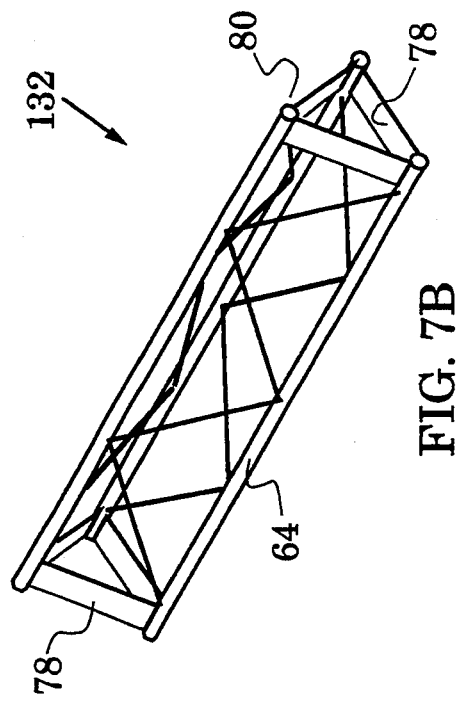
FIG. 7A is a schematized isometric view of another truss module embodiment.
Figure 7B:
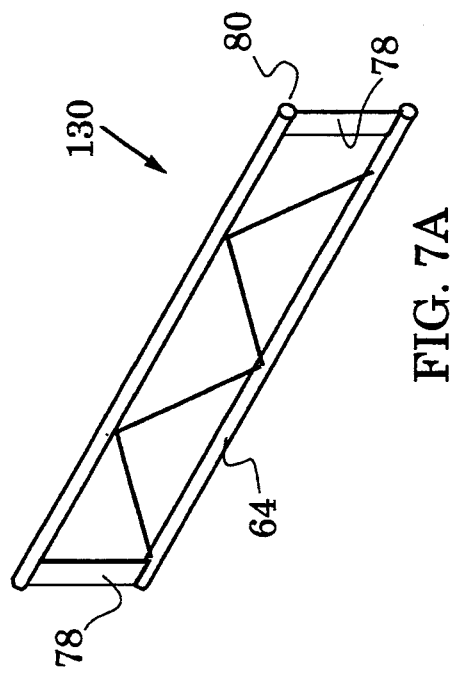
FIG. 7B is a schematized isometric view of another truss module embodiment.
Figure 7C:
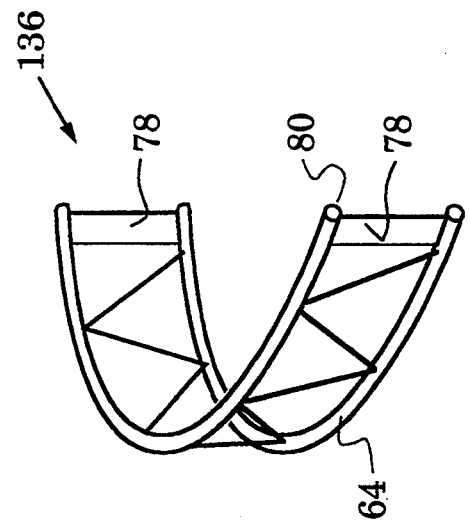
FIG. 7C is a schematized isometric view of another truss module embodiment.
Figure 7D:
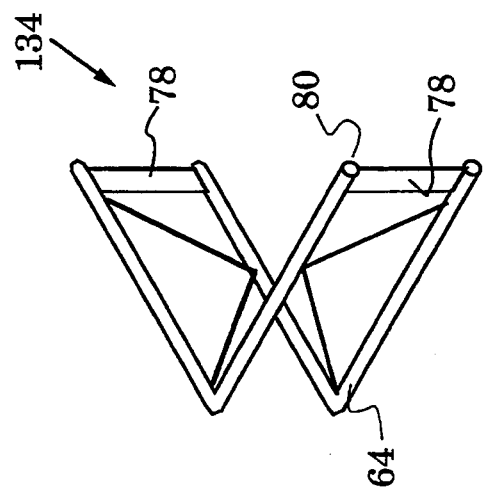
FIG. 7D is a schematized isometric view of another truss module embodiment.

Although modular truss modules in accordance with the invention have been illustrated with the square cross sectioned truss embodiment 62A, 62B of FIGS. 3, 6, it should be understood that the teachings of the invention extend to equivalent truss modules having other cross sectional shapes. For example, FIGS. 7 show other exemplary truss module shapes. Each of these truss modules may be formed to include the alignment features of the cups 80 and alignment members 82 (not shown in FIGS. 7) of FIGS. 3–6 and, in addition, the transverse and longitudinal strength of box shaped brace legs 78 disposed between structural members 64. FIG. 7A illustrates a truss module 130 having only two transversely spaced structural members 64. FIG. 7B illustrates a truss module 132 having a triangular cross section. Modular truss modules may also have nonparallel alignment faces as illustrated by members 134 and 136 respectively of FIGS. 7C, 7D. The truss module 134 defines a corner shaped truss while the truss module 136 defines a curved truss. Various other cross sections and longitudinal shapes may be defined to facilitate modular construction of assemblies such as the assembly 20 of FIG. 1.

From the foregoing it should now be recognized that embodiments of a modular truss system have been disclosed herein especially suited for support of lighting, cameras and the like in association with stage performances. Systems in accordance with the present invention include alignment structures that facilitate assembly of truss modules to reduce assembly time and increase productivity.

The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. A modular truss system, comprising:

a first truss module defining an intermodule face;
a second truss module defining an intermodule face;
first and second cups, each carried by a different one of said first and second truss modules and positioned to form a recess in its intermodule face; and
an alignment member configured to have a first portion thereof received in said first cup and a second portion thereof received in said second cup when the intermodule faces of said first and second truss modules are adjoining.

2. The modular truss system of claim 1 further including at least one fastener engaging each of said first and second truss modules to maintain their intermodule faces in an adjoining relationship.

3. The modular truss system of claim 1 wherein said first and second alignment member portions are each shaped to conform to the interior of their respective cups.

4. The modular truss system of claim 3 wherein said alignment member defines a plurality of ribs extending between said first and second portions to facilitate said alignment member's entry into and exit from either of said cups.

5. The modular truss system of claim 1 wherein:
each of said first and second truss modules includes at least one structural member presenting a hollow intermodule end thereof adjacent the truss module's intermodule face; and
each of said first and second cups is carried within the hollow intermodule end of a structural member of a different one of said truss modules.

6. The modular truss system of claim 1 wherein each of said first and second truss modules includes:
at least two structural members each presenting an intermodule end thereof adjacent the truss module's intermodule face; and
a brace having a hollow box shaped cross section disposed between each pair of said intermodule ends.

7. The modular truss system of claim 1 wherein each of said first and second truss modules includes:
four structural members each presenting an intermodule end thereof adjacent the truss module's alignment face; and
an X shaped brace disposed adjacent the truss module's alignment face with each end of said X shaped brace attached to a different one of said structural members.

8. A modular truss system, comprising:
a first truss module defining an intermodule face and at least one recess therein;
a second truss module defining an intermodule face and at least one recess therein; and
an alignment member configured to have a first portion thereof received in a recess of said first truss module and a second portion thereof received in a recess of said second truss module when the intermodule faces of said first and second truss modules are adjoining,
wherein each of said first and second truss modules carries at least one cup adjacent its intermodule face to form said recess and said first and second alignment member portions are tapered to facilitate their entry into and exit from either of said cups.

9. A modular truss system, comprising:
a first truss module defining an intermodule face and at least one recess therein;
a second truss module defining an intermodule face and at least one recess therein; and
an alignment member configured to have a first portion thereof received in a recess of said first truss module and a second portion thereof received in a recess of said second truss module when the intermodule faces of said first and second truss modules are adjoining,
wherein each of said first and second truss modules includes at least two structural members each presenting an intermodule end thereof adjacent the truss module's intermodule face, and
a brace having a hollow box shaped cross section disposed between each pair of said intermodule ends.

10. A modular truss system, comprising:
a first truss module defining an intermodule face and at least one recess therein;
a second truss module defining an intermodule face and at least one recess therein; and
an alignment member configured to have a first portion thereof received in a recess of said first truss module and a second portion thereof received in a recess of said second truss module when the intermodule faces of said first and second truss modules are adjoining,
wherein each of said first and second truss modules includes at least two structural members each presenting an intermodule end thereof adjacent the truss module's intermodule face, and
a brace having a hollow box shaped cross section disposed between each pair of said intermodule ends; and
at least one fastener engaging a brace of each of said first and second truss modules to maintain their intermodule faces in an adjoining relationship.

11. A method of forming a truss assembly, comprising the steps of:
providing a first truss module having an intermodule face and at least one recess therein;
providing a second truss module having an intermodule face and at least one recess therein;
receiving a first portion of an alignment member in a recess of said first truss module; and
causing the intermodule faces of said first and second truss modules to adjoin with a second portion of said alignment member received in a recess of said second truss module; and
engaging each of said first and Second truss modules with at least one fastener to maintain their intermodule faces in adjoining relationship.

12. A method of forming a truss assembly, comprising the steps of:
providing a first truss module having an intermodule face and at least one recess therein;
providing a second truss module having an intermodule face and at least one recess therein;
receiving a first portion of an alignment member in a recess of said first truss module; and
causing the intermodule faces of said first and second truss modules to adjoin with a second portion of said alignment member received in a recess of said second truss module;
wherein said providing steps each include the step of forming said recess with a cup carried adjacent said intermodule face and further including the step of tapering said first and second portions of said alignment member to facilitate their entry into and exit from either of said cups.

* * * * *